United States Patent
Kawada et al.

(10) Patent No.: US 7,622,878 B2
(45) Date of Patent: Nov. 24, 2009

(54) WIPER UNIT CONTROLLER AND METHOD FOR CONTROLLING WIPER UNIT

(75) Inventors: Mitsuhiro Kawada, Aichi (JP); Tadaaki Ichizono, Aichi (JP); Kazuhiko Matsuba, Nagoya (JP)

(73) Assignees: Kabushiki Kaisha Tokai Rika Denki Seisakusho, Aichi (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 703 days.

(21) Appl. No.: 11/446,650

(22) Filed: Jun. 5, 2006

(65) Prior Publication Data

US 2006/0272118 A1  Dec. 7, 2006

(30) Foreign Application Priority Data

Jun. 6, 2005    (JP) .............................. 2005-165809

(51) Int. Cl.
*H02P 1/04* (2006.01)

(52) U.S. Cl. ........................ 318/444; 318/443; 318/445; 318/478; 15/250.13

(58) Field of Classification Search ................ 318/443, 318/444, 445, 458, 478, 549; 15/250.13
See application file for complete search history.

(56) References Cited

U.S. PATENT DOCUMENTS

| 4,689,536 | A | * | 8/1987 | Iyoda ......................... 318/483 |
| 5,216,341 | A | * | 6/1993 | Nomura et al. ............. 318/444 |
| 5,241,248 | A | * | 8/1993 | Furukoshi ................... 318/444 |
| 5,694,011 | A | * | 12/1997 | Corey et al. ................. 318/444 |
| 6,400,110 | B1 | * | 6/2002 | Yabe et al. .................. 318/443 |

FOREIGN PATENT DOCUMENTS

| EP | 1 724 169 A1 | 11/2006 |
| JP | 58-36747 | 3/1983 |
| JP | 10-315919 | 12/1998 |
| WO | WO 2006/068561 A1 | 6/2006 |

\* cited by examiner

*Primary Examiner*—Bentsu Ro
*Assistant Examiner*—Thai Dinh
(74) *Attorney, Agent, or Firm*—Patterson, Thuente, Skaar & Christensen, P.A.

(57) ABSTRACT

A wiper unit controller for performing wiping at an accurate intermittent wipe cycle. The controller stores a maximum resistance value of a variable resistor having a resistance value that varies in accordance with the intermittent wipe cycle. When a reference time elapses after calculating a resistance value that exceeds the stored maximum resistance value, a computer renews the maximum resistance value with a new maximum resistance value.

10 Claims, 3 Drawing Sheets

WIPER UNIT CONTROLLER AND METHOD FOR CONTROLLING WIPER UNIT

BACKGROUND OF THE INVENTION

The present invention relates to a wiper unit controller and a method for controlling a wiper unit.

Automobiles are equipped with wiper units for improving visibility when driving in the rain. A wiper unit includes a lever, which is located near the steering wheel. The lever is operated to activate a wiper switch and select one of an off position "OFF", an intermittent wipe mode position "INT", a low speed wipe mode position "LO", and a high speed wipe mode position "HI". As a result, a wiper of the wiper unit wipes the windshield glass in the selected mode. A knob is located at the distal end of the lever. When the lever is arranged at the intermittent wipe mode position "INT", the driver rotates the knob so that the wiper performs intermittent wiping at a desirable cycle, which is in accordance with the rotational position of the knob (refer to, for example, Japanese Laid-Open Patent Publication No. 10-315919).

In the intermittent wipe mode, a variable resistor (volume) is used to reflect the rotational position of the knob in the intermittent wipe cycle. That is, when the knob is rotated during the intermittent wipe mode, the resistance value of the variable resistor varies accordingly. A controller detects the resistance value of the variable resistor and determines the intermittent wipe cycle in accordance with the resistance value.

More specifically, with reference to FIG. 5, a wiper unit 101 includes a fixed resistor 111 and a variable resistor 112. The fixed resistor 111 and the variable resistor 112 are connected in series between positive and negative terminals of a constant voltage power supply. The fixed resistor 111 and the variable resistor 112 divide the voltage output from the constant voltage power supply to generate divided voltage V, which is input to a controller 120. The voltage V input to the controller 120 may be expressed by the next equation when the voltage output from the constant voltage power supply is represented by Vcc, the resistance value of the fixed resistor 111 is represented by R1, and the resistance value of the variable resistor 112 is represented by Rv.

$$V = Vcc \times Rv/(R1+Rv)$$

From this equation, Rv may be expressed by the next equation.

$$Rv = R1 \times V/(Vcc-V)$$

Accordingly, by storing the values of R1 and Vcc in the controller 120, these values may be used to enable detection of the resistance value Rv of the variable resistor 112, which is in accordance with the rotational position of the knob. The controller 120 recognizes the rotational position of the knob from the ratio of the resistance value Rv of the variable resistor 112 relative to the maximum resistance value of the variable resistor 112. The controller 120 then determines the intermittent wipe cycle in accordance with the recognized rotational position of the knob.

To determine the intermittent wipe cycle in this manner, the controller 120 must store the maximum resistance value of the variable resistor 112. However, the maximum resistance value of the variable resistor 112 has a relatively large tolerance (for example, ±30% relative to a reference resistance value). Thus, the maximum resistance value varies between different variable resistors. Therefore, when the reference resistance value, or ideal maximum resistance value, of the variable resistor 112 is, for example, 1000Ω, the controller 120 stores a value corresponding to a variance of −30% (e.g., 700Ω) as an initial value of the maximum resistance value. If a resistance value Rv that is greater than the stored maximum resistance value is obtained through the above equation, the controller 120 stores that resistance value Rv as a new maximum resistance value. In other words, the controller 120 renews the maximum resistance value of the variable resistor 112 so as to accurately recognize the rotational position of the knob from the ratio of the actual resistance value relative to the maximum resistance value. The renewal of the maximum resistance value is repeated so that it approaches the actual maximum resistance value of the variable resistor 112.

When the variable resistor 112 is used under a low temperature environment (e.g., minus 30 degrees Celsius), the detected resistance value Rv may temporarily exceed the stored maximum resistance value. In such a case, the maximum resistance value would be renewed by the resistance value Rv even though it is a temporary value. If the maximum resistance value is once renewed to such a large value, it cannot be renewed to a smaller value thereafter. Accordingly, if the temperature subsequently increases to a normal temperature (e.g., 25 degrees Celsius), the rotational position of the knob is recognized using that stored maximum resistance value (i.e., the value taken under a low temperature and being greater than a value taken under a normal temperature). As a result, an error occurs between the actual rotational position of the knob and the rotational position of the knob recognized by the controller 120. This hinders wiping at an intermittent wipe cycle that is in accordance with the rotational position of the knob.

SUMMARY OF THE INVENTION

The present invention provides a wiper unit controller for accurately recognizing the position of an intermittent wipe cycle adjustment knob to enable wiping at an intermittent wipe cycle that accurately corresponds to the position of the knob.

One aspect of the present invention is a wiper unit controller for controlling a wiper unit including a wiper and a variable resistor for setting an intermittent wipe cycle of the wiper. The variable resistor has a variable resistance value, and the intermittent wipe cycle of the wiper is set in accordance with the resistance value of the variable resistor. The wiper unit controller is provided with a computer for determining the intermittent wipe cycle of the wiper from the resistance value of the variable resistor. The computer includes a storing means for storing a maximum resistance value of the variable resistor, a detecting means for detecting the resistance value of the variable resistor, a renewing means for renewing the maximum resistance value stored in the storing means with a new maximum resistance value when the detecting means detects a resistance value that is greater than the maximum resistance value of the variable resistor stored in the storing means, a recognizing means for recognizing the intermittent wipe cycle of the wiper from the ratio of the resistance value detected by the detecting means relative to the maximum resistance value of the variable resistor, and a setting means for setting the intermittent wipe cycle recognized by the recognizing means. The renewing means renews the maximum resistance value with a detected new maximum resistance value if a reference time elapses from when the detecting means detects a resistance value that is greater than the maximum resistance value of the variable resistor stored in the storing means.

Another aspect of the present invention is a wiper unit including a wiper operable for intermittently wiping a windshield glass. The wiper unit is provided with a variable resistor for setting an intermittent wipe cycle of the wiper. The variable resistor has a variable resistance value, and the intermittent wipe cycle of the wiper is set in accordance with the resistance value of the variable resistor. A wiper unit controller, connected to the variable resistor, controls the intermittent wipe cycle of the wiper. The controller includes a computer for determining the intermittent wipe cycle of the wiper from the resistance value of the variable resistor. The computer includes a memory for storing a maximum resistance value of the variable resistor, a detecting means for detecting the resistance value of the variable resistor, a renewing means for renewing the maximum resistance value with a new detected maximum resistance value when a predetermined time elapses from when the detecting means detects a resistance value that is greater than the maximum resistance value of the variable resistor stored in the memory, a recognizing means for recognizing the intermittent wipe cycle of the wiper from the ratio of the resistance value detected by the detecting means relative to the maximum resistance value of the variable resistor, and a setting means for setting the intermittent wipe cycle recognized by the recognizing means.

A further aspect of the present invention is a method for controlling a wiper unit including a wiper and a variable resistor for setting an intermittent wipe cycle of the wiper. The variable resistor has a variable resistance value, and the intermittent wipe cycle of the wiper is set in accordance with the resistance value of the variable resistor. The method includes storing a maximum resistance value of the variable resistor, detecting the resistance value of the variable resistor, renewing the maximum resistance value with a new detected maximum resistance value when a predetermined reference time elapses from when a resistance value that is greater than the stored maximum resistance value is detected, recognizing the intermittent wipe cycle of the wiper from the ratio of the detected resistance value relative to the maximum resistance value of the variable resistor, and setting the recognized intermittent wipe cycle.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A wiper unit 1 for use in an automobile according to a preferred embodiment of the present invention will now be discussed.

Figure 1:
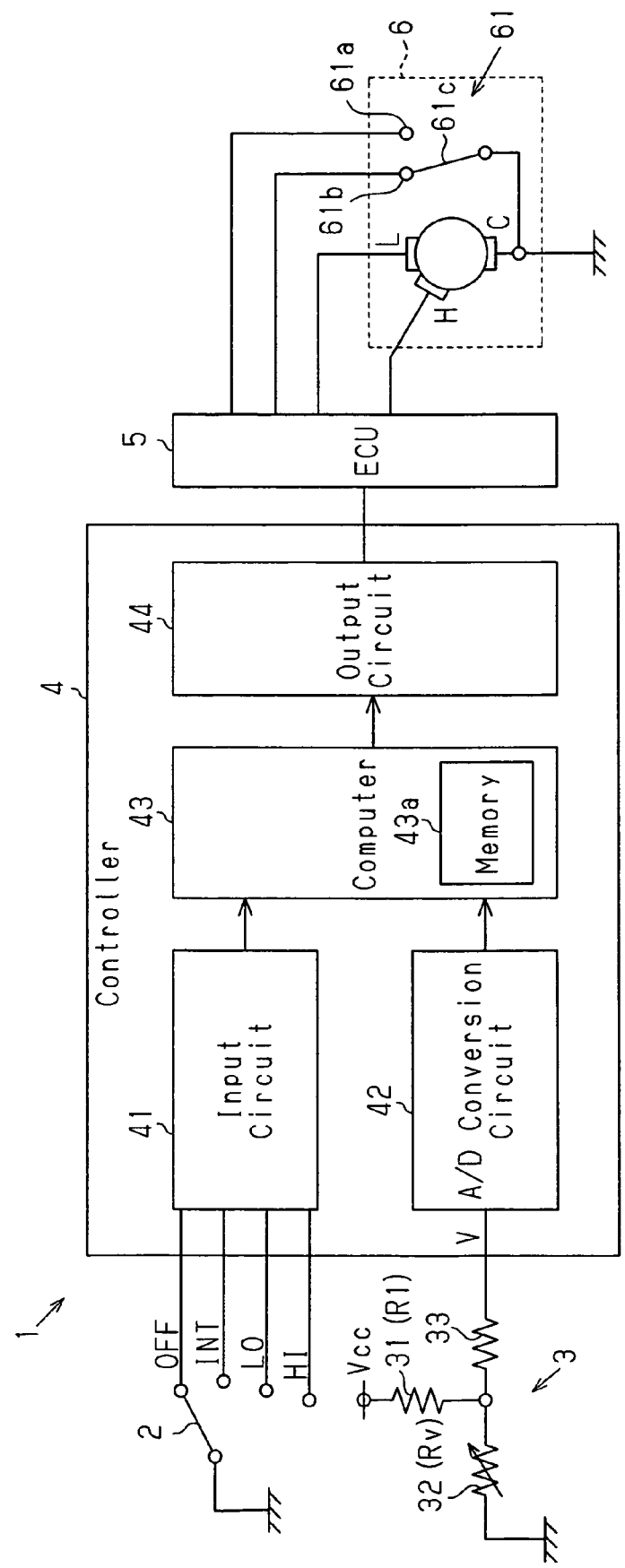
FIG. 1 is a block diagram showing the electrical configuration of a wiper unit according to a preferred embodiment of the present invention.

As shown in FIG. 1, the wiper unit 1 includes a wiper switch 2, a resistor circuit 3, a controller 4, an ECU 5, and a wiper motor 6.

The wiper switch 2 is switched between a plurality of positions in accordance with the operation of a wiper lever, which is arranged in the passenger compartment. More specifically, the wiper switch 2 is selectively switched between an off position "OFF", an intermittent wipe mode position "INT", a low speed wipe mode position "LO", and a high speed wipe mode position "HI". The wiper switch 2 provides the controller 4 with a detection signal indicating the location of the wiper switch 2. Accordingly, when such a detection signal is provided from the wiper switch 2 to the controller 4, the controller 4 is able to recognize the position of the wiper switch 2. This enables the wiping of the windshield window in a wipe mode that is in accordance with the position of the wiper switch 2.

The resistor circuit 3 includes a pullup resistor 31, a variable resistor 32 (volume), and a current restriction resistor 33. The variable resistor 32 has a resistance value that varies in accordance with the rotational position of an intermittent wipe cycle adjustment knob, which is located at a distal end of the lever. In the preferred embodiment, the knob is rotatable between positions P1 to P4 to set the intermittent wipe cycle at one of four cycles. The knob clicks at each of the four positions P1 to P4.

The electrical configuration of the resistor circuit 3 will now be described. The pullup resistor 31 and the variable resistor 32 are connected in series between positive and negative terminals of a constant voltage power supply. The pullup resistor 31 includes one terminal connected to the positive terminal of the constant voltage power supply and another terminal connected to a terminal of the variable resistor 32. The other terminal of the variable resistor 32 is electrically connected to the negative terminal of the constant voltage power supply. The current restriction resistor 33 has one terminal electrically connected to a median point between the pullup resistor 31 and the variable resistor 32 and another terminal electrically connected to the controller 4. Accordingly, the pullup resistor 31 and the variable resistor 32 divide the voltage output from the constant voltage power supply. The divided voltage is input to the controller 4 via the current restriction resistor 33.

The voltage V input to the controller 4 may be expressed by the next equation when the voltage output from the constant voltage power supply is represented by Vcc, the resistance value of the pullup resistor 31 is represented by R1, and the resistance value of the variable resistor 32 is represented by Rv.

$$V = Vcc \times Rv/(R1+Rv) \qquad \text{equation 1}$$

From this equation, Rv may be expressed by the next equation.

$$Rv = R1 \times V/(Vcc-V) \qquad \text{equation 2}$$

Accordingly, the values of R1 and Vcc, which may be regarded as fixed values, are stored in the controller 4 and used with the voltage V input to the controller 4 to obtain the electric resistance value Rv of the variable resistor 32, that is, detect the rotational position of the knob with the controller 4. This enables the controller 4 to determine the intermittent wipe cycle that is in accordance with the rotational position of the knob and perform wiping at the determined intermittent wipe cycle.

The controller 4 includes an input circuit 41, an A/D conversion circuit 42, a computer 43, and an output circuit 44. When receiving a detection signal from the wiper switch 2, the input circuit 41 recognizes the position of the wiper switch 2. That is, the input circuit 41 recognizes whether the driver desires to operate the wiper unit 1 in a wipe suspension mode, an intermittent wipe mode, a low speed wipe mode, or a high speed wipe mode. The input circuit 41 provides the computer 43 with a signal requesting for a wiping to be performed in the recognized wipe mode (wipe request signal).

When receiving the voltage V divided by the pullup resistor 31 and the variable resistor 32, the A/D conversion circuit 42 converts the voltage V, which is an analog value, to a digital value. The A/D conversion circuit 42 then provides the computer 43 with the A/D converted voltage V.

When receiving the wipe request signal from the input circuit 41, the computer 43 sets the wiper unit 1 in the wipe mode that is requested by the wipe request signal. Then, the computer 43 provides the output circuit 44 with a signal instructing wiping to be performed in the requested wipe mode (wipe instruction signal). For example, when receiving a wipe request signal requesting wiping to be performed in the intermittent wipe mode, the computer 43 sets the wiper unit 1 in the intermittent wipe mode and provides the output circuit 44 with a wipe instruction signal instructing wiping to be performed in the intermittent wipe mode.

The computer 43 includes a non-volatile memory 43a. The memory 43a stores the resistance value R1 of the pullup resistor 31, the voltage Vcc output from the constant voltage power supply, and the maximum resistance value of the variable resistor 32.

When receiving the voltage V from the A/D conversion circuit 42, the computer 43 computes the resistance value Rv of the variable resistor 32 from the above equation 2 with the input voltage V, the resistance value R1 of the pullup resistor 31 that is stored in the memory 43a, and the voltage Vcc output from the constant voltage power supply that is also stored in the memory 43a. When computing the resistance value of the variable resistor 32 in this manner, the computer 43 recognizes the rotational position of the knob from the ratio of the resistance value Rv relative to the maximum resistance value of the variable resistor 32. Then, the computer 43 determines the intermittent wipe cycle in accordance with the recognized rotational position of the knob.

When the wiper unit 1 is set in the intermittent wipe mode, the computer 43 reflects the determined intermittent wipe cycle in the wipe instruction signal. For example, if the knob is recognized as being arranged at position P0, the computer 43 provides the output circuit 44 with a wipe instruction signal instructing wiping to be performed in the shortest intermittent wipe cycle. If the knob is recognized as being arranged at position P4, the computer 43 provides the output circuit 44 with a wipe instruction signal instructing wiping to be performed in the longest intermittent wipe cycle.

When the wipe instruction signal is received from the computer 43, the output circuit 44 modulates the wipe instruction signal into a format applicable to the ECU 5. The output circuit 44 then transmits the modulated wipe instruction signal to the ECU 5.

The ECU 5 demodulates the wipe instruction signal received from the output circuit 44. Then, the ECU 5 drives a wiper motor 6 to perform wiping in the mode instructed by the wipe instruction signal.

The wiper motor 6 is a drive source for moving a wiper back and forth on the windshield glass. The wiper wipes the windshield glass as it moves back and forth along the surface of the windshield glass from a standby position. The wiper motor 6 produces rotation at two speeds, a high speed and a low speed. The wiper motor 6 includes a high speed rotation terminal H and a low speed rotation terminal L, which are electrically connected to the ECU 5, and a common terminal C, which is connected to ground.

The ECU 5 produces high speed rotation with the wiper motor 6 by supplying the wiper motor 6 with drive current via the high speed rotation terminal H when a wipe instruction signal instructing wiping in the high speed wiping mode is received from the output circuit 44. Further, the ECU 5 produces low speed rotation with the wiper motor 6 by supplying the wiper motor 6 with drive current via the low speed rotation terminal L when a wipe instruction signal instructing wiping in the low speed wiping mode is received from the output circuit 44.

The wiper motor 6 incorporates a constant position detection switch 61 for detecting when the wiper reaches the standby position. The constant position detection switch 61 includes a first fixed contact 61a and a second fixed contact 61b, each electrically connected to the ECU 5, and a movable contact 61c, which is connected to ground. As the wiper moves back and forth, the position detection switch 61 switches between a state in which the first fixed contact 61a of the movable contact 61c is electrically connected to the first fixed contact 61a and a state in which the movable contact 61c is electrically connected to the second fixed contact 61b. Accordingly, when the movable contact 61c is electrically connected to the second fixed contact 61b, the ECU 5 recognizes that the wiper is located at the standby position.

When receiving a wipe instruction signal, which instructs wiping in the intermittent wipe mode, from the output circuit 44, the ECU 5 equalizes the intermittent wipe cycle instructed by the wipe instruction signal with the cycle for supplying the wiper motor 6 with drive current via the low speed rotation terminal L. As a result, the wiper motor 6 produces rotation at a low speed in the intermittent wipe cycle.

In a state in which the ECU 5 is supplying the wiper motor 6 with drive current to perform wiping in any one of the high speed wiping mode, the low speed wiping mode, and the intermittent wiping mode, the ECU 5 stops supplying the wiper motor 6 with drive current when receiving a wipe instruction signal, which instructs the wiping to be stopped, from the output circuit 44. As a result, the wiper motor 6 stops producing rotation.

The maximum resistance value of the variable resistor 32 has a relatively large tolerance (for example, ±30% relative to a reference resistance value). Thus, the maximum resistance value varies between different variable resistors. It is not realistic to use variable resistors having a maximum resistance value that does not vary from the reference value of, for example, 1000Ω. Therefore, variable resistors having a maximum resistance value in the range of 700Ω to 1300Ω are actually used as the variable resistor 32.

Even if the rotational position of the knob is the same, the resistance value Rv of the variable resistor 32 would differ between a variable resistor 32 having a maximum resistance value of 700Ω and a variable resistor 32 having a maximum resistance value of 1000Ω. Thus, as apparent from the above equation 1, different voltages V would be input to the controller 4. As a result, when detecting the resistance value Rv of each variable resistor 32 from the above equation 2 with different voltages, the rotational position of the knob, which is recognized from the ratio of the resistance value Rv relative to the maximum resistance value of the variable resistor 32 stored in the memory 43a, would vary between different variable resistors.

Figure 2:
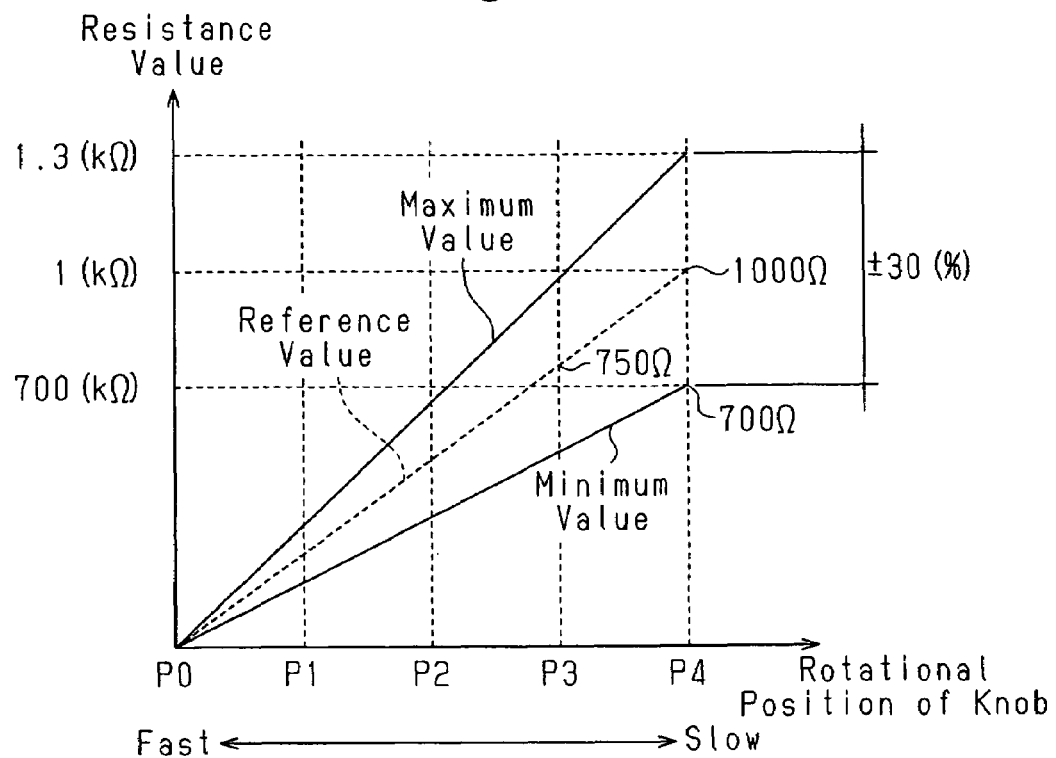
FIG. 2 is a characteristic chart showing the relationship between the rotational position of a knob and the resistance value of the variable resistor.

With reference to FIG. 2, when the variable resistor 32 has a maximum resistance value of 700Ω and the knob is rotated to position P4, the resistance value Rv detected by the controller is 700Ω. If 700Ω is stored in the memory 43a as the maximum resistance value of the variable resistor 32 and 700Ω is detected as the maximum resistance value of the variable resistor 32, the controller 4 would recognize that the knob has been rotated to position P4. In such a case, there are no problems. However, if 1000Ω is stored in the memory 43a as the maximum resistance value of the variable resistor 32 and 700Ω is detected as the maximum resistance value of the variable resistor 32, the controller 4 would erroneously recognize the knob as having been rotated to a position before the position P3 even though the knob has actually been rotated to position P4.

Therefore, the computer 43 renews the maximum resistance value of the variable resistor 32 stored in the memory 43a in the following manner. As the initial maximum resistance value of the variable resistor 32, the computer 43 stores a maximum resistance value corresponding to a variance of −30% (700Ω) with respect to the reference value (1000Ω). When the resistance value Rv, computed from the above equation (2), exceeds the stored maximum resistance value, the computer 43 stores the computed resistance value Rv as a new maximum resistance value Rv. The computer 43 renews the maximum resistance value of the variable resistor 32 in this manner and accurately recognizes the rotational position of the knob from the ratio of the resistance value Rv relative to the renewed maximum resistance value. The renewal is repeated so that the stored maximum resistance value approaches the actual maximum resistance value of the variable resistor 32.

Figure 3:
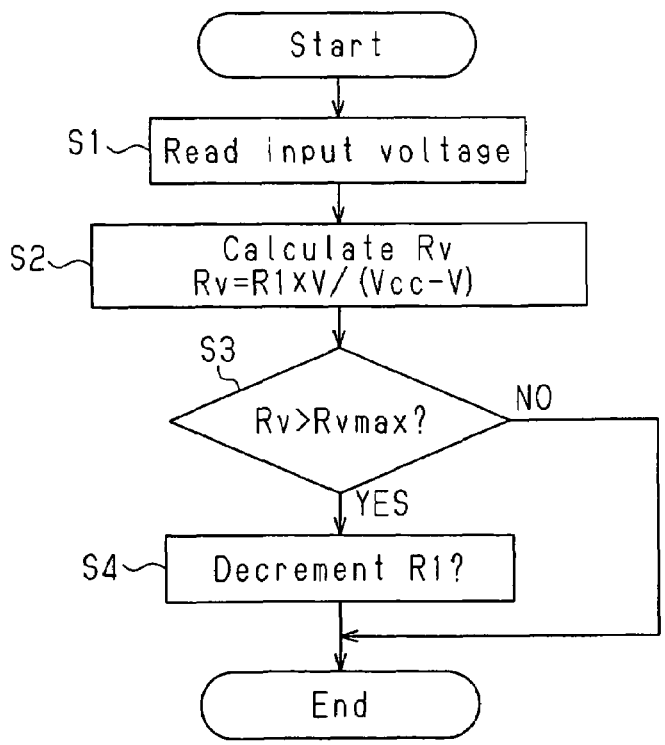
FIG. 3 is a flowchart illustrating a process executed by a computer to correct the resistance value of the variable resistor.

The computer 43 corrects the resistance value Rv of the variable resistor 32 computed from the above equation 2. The correction of the resistance value Rv of the variable resistor 32 that is executed by the computer 43 will now be described with reference to the flowchart of FIG. 3.

In step S1, the computer 43 reads the voltage V input from the A/D conversion circuit 42. In step S2, the computer 43 computes the resistance value Rv of the variable resistor 32 from the above equation 2 using the input voltage V read in step S1, the resistance value R1 of the pullup resistor 31 that is stored in the memory 43a, and the voltage Vcc output from the constant voltage power supply that is also stored in the memory 43a.

In step S3, the computer 43 determines whether the resistance value Rv of the variable resistor 32 computed in step S2 is greater than a maximum transmission value Rvmax stored in the memory 43a. The maximum transmission value Rvmax corresponds to the maximum resistance value of the variable resistor 32 when the knob is arranged at position P4 and is included in the wipe instruction signal transmitted from the output circuit 44 to the ECU 5. If the resistance value Rv of the variable resistor 32 computed in step S2 is greater than the maximum transmission value Rvmax, that resistance value Rv is stored in the memory 43a as a new maximum resistance value.

More specifically, if the computer 43 determines that the resistance value Rv of the variable resistor 32 computed in step S2 is greater than the maximum transmission value Rvmax (YES in step S3), the computer 43 decrements the resistance value R1 of the pullup resistor 31 stored in the memory 43a in step S4. When step S2 is subsequently executed, the resistance value Rv of the variable resistor 32 that is computed using the decremented resistance value R1 becomes smaller than the resistance value computed prior to the decrementing of the resistance value R1.

In this manner, when the resistance value Rv computed from the above equation 2 is greater than the maximum transmission value Rvmax, the computer 43 decrements the resistance value R1 of the pullup resistor 31. The decremented resistance value R1 corrects the resistance value Rv of the variable resistor 32.

Figure 4:
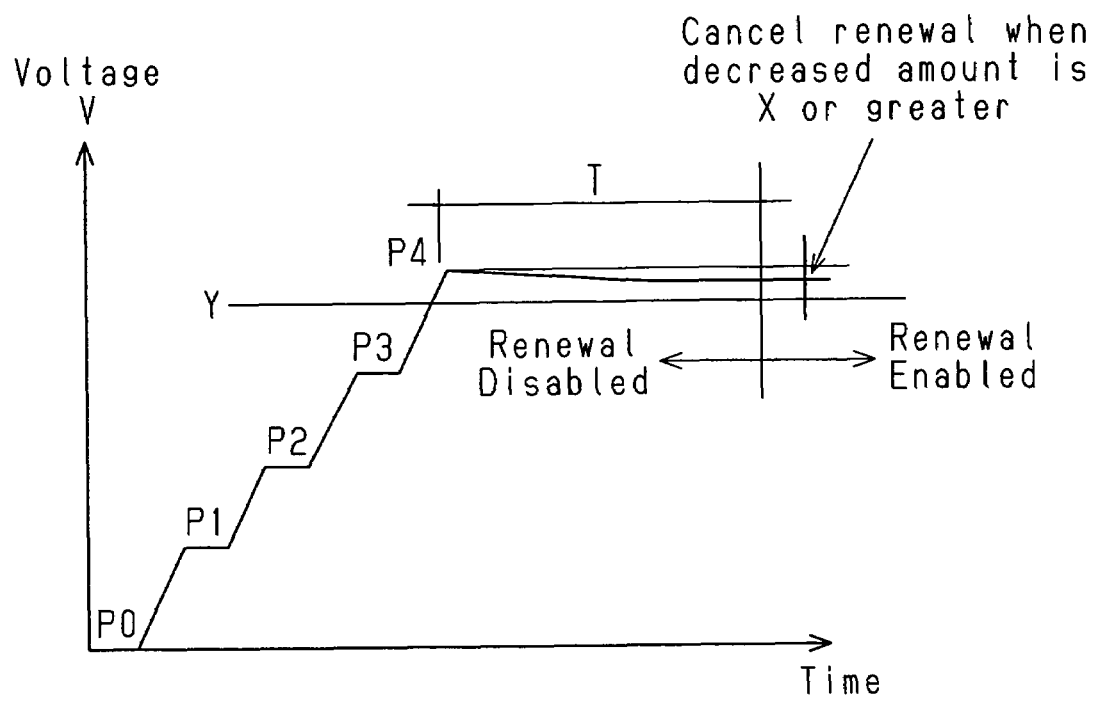
FIG. 4 is a characteristic chart showing voltage input to the computer from an A/D conversion circuit as time elapses when the knob is rotated.
Figure 5:
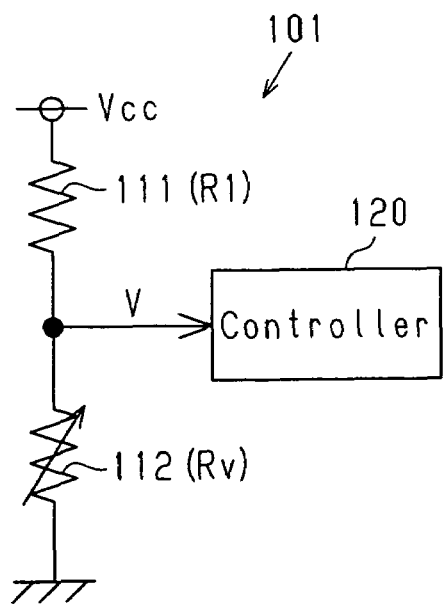
FIG. 5 is a block diagram showing part of the electrical configuration of a wiper unit in the prior art.

Referring to FIG. 4, if the knob is rotated to position P4 when the temperature is low (e.g., minus 30 degrees Celsius), the computer 43 reads the maximum value of the voltage V input from the A/D conversion circuit 42. The voltage V continues to decrease for a certain period. In a state in which the voltage V stops decreasing, the voltage V read by the computer 43 would still be greater than that under normal temperatures (e.g., 25 degrees Celsius).

If the renewal of the maximum resistance value were to be performed using the voltage V that shifts in this manner, this voltage V would be used to calculate the resistance value Rv (step S2). When the resistance value Rv calculated in this manner exceeds the maximum transmission value Rvmax (YES in step S3), the resistance value R1 would be decremented (step S4). Thus, the resistance value Rv calculated from the resistance value R1, which is decremented in this manner, would decrease (subsequent step S2). Subsequently, the resistance value R1 would be repeatedly decremented until the resistance value Rv becomes less than or equal to the maximum transmission value Rvmax. Thus, the resistance value Rv would gradually decrease.

As a result, the following shortcoming would occur when the low temperature increases to a normal temperature. The resistance value R1, which has been decremented and decreased under a low temperature state, is used to calculate the resistance value Rv. Therefore, when the rotational position of the knob is recognized from the ratio of the resistance value Rv relative to the maximum resistance value stored in the memory 43a, the recognized rotational position of the knob would differ from the actual position.

Accordingly, when the calculated resistance value Rv exceeds the maximum transmission value Rvmax, the computer 43 does not decrement (learn) the resistance value R1 until a reference time T elapses from when the resistance value Rv is calculated. More specifically, the computer 43 refrains from storing a calculated resistance value Rv as the new maximum resistance value corresponding to the maximum transmission value Rvmax in the memory 43a until the reference time T elapses from when calculating a resistance value Rv (first resistance value) that exceeds the stored maximum resistance value. Further, when a resistance value (second resistance value) greater than the first resistance value is calculated, the computer 43 refrains from storing a calculated resistance value Rv as the new maximum resistance value in the memory 43a until the reference time T elapses from when the second resistance value is calculated. The reference time T is, for example, 640 ms.

Additionally, in cases in which the resistance value Rv calculated by the computer 43 does not exceed the maximum transmission value Rvmax when the knob is arranged at position P4, the computer 43 increments the resistance value R1 when each of conditions A to C listed below are satisfied.

Condition A: During the period until the reference time T elapses from when the resistance value Rv is calculated, a greater resistance value Rv is not subsequently calculated.

Condition B: After the calculation of a resistance value Rv that is greater than or equal to a predetermined reference resistance value Y, the reference time T elapses without the calculation of a resistance value Rv that is less than the reference resistance value Y. The reference resistance value Y is the lowest resistance value that can be applied without manually rotating the knob from position P4 under a normal temperature.

Condition C: Subsequent to the calculation of a resistance value Rv, a resistance value Rv that is less by a predetermined reference amount X is not calculated. The reference amount X is the maximum decrease amount that can be applied without manually rotating the knob from position P4 under a normal temperature.

When calculating a resistance value Rv (third resistance value) that is lower than the first resistance value by the reference amount X, the computer 43 refrains from storing any of the resistance values Rv in the memory 43a to renew the maximum resistance value for position P4. In such a case, the computer 43 obtains the rotational position of the knob from the ratio of the resistance value Rv relative to the stored maximum resistance value.

The preferred embodiment has the advantages described below.

(1) After the calculation of a resistance value Rv (first resistance value) exceeding the stored maximum resistance value, resistance values Rv, which have low reliability, are not stored in the memory 43a for renewal of the maximum resistance value until the reference time T elapses. Thus, even when the environment of the wiper unit 1 shifts from a low temperature state to a normal temperature state, the rotational position of the knob is recognized using a maximum resistance value, which has a high reliability. Accordingly, the rotational position of the knob is accurately recognized, and intermittent wiping is performed in a cycle that accurately corresponds to the rotational position of the knob.

(2) During the reference period T after the calculation of the first resistance value, if a greater resistance value Rv (second resistance value) is calculated, resistance values Rv, which have low reliability, are not stored in the memory 43a for renewal of the maximum resistance value until a further reference time T elapses. Thus, the rotational position of the knob is recognized using a maximum resistance value, which has a high reliability. Accordingly, the rotational position of the knob is accurately recognized, and intermittent wiping is performed in a cycle that accurately corresponds to the rotational position of the knob.

(3) When a resistance value Rv, or third resistance value, that is smaller than the first resistance value by the reference amount X is calculated, there is a high possibility that the knob has been manually rotated. Such a third resistance value is not used for renewal of the maximum resistance value. Thus, the rotational position of the knob is recognized using a maximum resistance value, which has a high reliability. Accordingly, the rotational position of the knob is accurately recognized, and intermittent wiping is performed in a cycle that accurately corresponds to the rotational position of the knob.

(4) Even if the resistance value R1 is decremented (learned) under a low temperature to correct the resistance value Rv to a lower value, the resistance value R1 is incremented (re-learned) when certain conditions are satisfied as the temperature becomes normal. This corrects the resistance value Rv to a value that is greater than that taken under a low temperature. Accordingly, even if such change in temperature occurs, intermittent wiping is performed in a cycle that accurately corresponds to the rotational position of the knob.

It should be apparent to those skilled in the art that the present invention may be embodied in many other specific forms without departing from the spirit or scope of the invention. Particularly, it should be understood that the present invention may be embodied in the following forms.

The reference time T may be the time required for the voltage V to stop decreasing after the knob is rotated to position P4 under a low temperature. Alternatively, the reference time T may be the total of a margin time and the time required for the voltage V to stop decreasing after the knob is rotated to position P4 under a low temperature.

In the same manner, the reference resistance value Y and the reference amount may include margins.

The voltage V may be a value read by the computer 43 or an average value of a predetermined number of values that have been read by the computer 43. The voltage V may also be an average value of values from which a maximum value and a minimum value have been excluded.

A case in which re-learning is performed when the temperature shifts from a low value to a normal value has been given as an example in the preferred embodiment. However, this is only one example. For example, wear of the variable resistor 32 may change the resistance value. Re-learning may also be performed in such a case. The present invention is applicable whenever the resistance value Rv of the variable resistor 32 changes.

The present examples and embodiments are to be considered as illustrative and not restrictive, and the invention is not to be limited to the details given herein, but may be modified within the scope and equivalence of the appended claims.

What is claimed is:

1. A wiper unit controller for controlling a wiper unit including a wiper and a variable resistor for setting an intermittent wipe cycle of the wiper, wherein the variable resistor has a variable resistance value, and the intermittent wipe cycle of the wiper is set in accordance with the resistance value of the variable resistor, the wiper unit controller comprising:

a computer for determining the intermittent wipe cycle of the wiper from the resistance value of the variable resistor, the computer including:

a storing means for storing a maximum resistance value of the variable resistor;

a detecting means for detecting the resistance value of the variable resistor;

a renewing means for renewing the maximum resistance value stored in the storing means with a new maximum resistance value when the detecting means detects a resistance value that is greater than the maximum resistance value of the variable resistor stored in the storing means;

a recognizing means for recognizing the intermittent wipe cycle of the wiper from the ratio of the resistance value detected by the detecting means relative to the maximum resistance value of the variable resistor; and a setting means for setting the intermittent wipe cycle recognized by the recognizing means;

wherein the renewing means renews the maximum resistance value with a detected new maximum resistance value if a predetermined reference time elapses from when the detecting means detects a resistance value that is greater than the maximum resistance value of the variable resistor stored in the storing means.

2. The wiper unit controller according to claim 1, wherein if the detecting means detects a first resistance value that is greater than the maximum resistance value of the variable resistor stored in the storing means and then detects a second resistance value, which is greater than the first resistance value, before the reference time elapses, the renewing means renews the maximum resistance value stored in the storing means with a new maximum resistance value after the reference time elapses from when the second resistance value is detected.

3. The wiper unit controller according to claim 1, wherein:
the renewing means refrains from updating the maximum resistance value until the reference time elapses from when the detecting means detects a resistance value that is greater than the maximum resistance value of the variable resistor stored in the storing means if the resistance value decreases by a predetermined amount or more; and
the recognizing means recognizes a change in the intermittent wipe cycle of the wiper when the resistance value decreases by the predetermined amount.

4. The wiper unit controller according to claim 1, wherein the computer further includes a memory that functions as the storing means for storing the maximum resistance value of the variable resistor.

5. A wiper unit including a wiper operable for intermittently wiping a windshield glass, the wiper unit comprising:
a variable resistor for setting an intermittent wipe cycle of the wiper, wherein the variable resistor has a variable resistance value, and the intermittent wipe cycle of the wiper is set in accordance with the resistance value of the variable resistor; and
a wiper unit controller, connected to the variable resistor, for controlling the intermittent wipe cycle of the wiper, wherein the controller includes a computer for determining the intermittent wipe cycle of the wiper from the resistance value of the variable resistor, the computer including:
a memory for storing a maximum resistance value of the variable resistor;
a detecting means for detecting the resistance value of the variable resistor;
a renewing means for renewing the maximum resistance value with a new detected maximum resistance value if a predetermined reference time elapses from when the detecting means detects a resistance value that is greater than the maximum resistance value of the variable resistor stored in the memory;
a recognizing means for recognizing the intermittent wipe cycle of the wiper from the ratio of the resistance value detected by the detecting means relative to the maximum resistance value of the variable resistor; and
a setting means for setting the intermittent wipe cycle recognized by the recognizing means.

6. The wiper unit according to claim 5, wherein if the detecting means detects a first resistance value that is greater than the maximum resistance value of the variable resistor stored in the memory and then detects a second resistance value, which is greater than the first resistance value, before the reference time elapses, the renewing means renews the maximum resistance value stored in the memory with a new maximum resistance value after the reference time elapses from when the second resistance value is detected.

7. The wiper unit according to claim 5, wherein:
the renewing means refrains from updating the maximum resistance value until the reference time elapses from when the detecting means detects a resistance value that is greater than the maximum resistance value of the variable resistor stored in the memory if the resistance value decreases by a predetermined amount or more; and
the recognizing means recognizes a change in the intermittent wipe cycle of the wiper when the resistance value decreases by the predetermined amount.

8. A method for controlling a wiper unit including a wiper and a variable resistor for setting an intermittent wipe cycle of the wiper, wherein the variable resistor has a variable resistance value, and the intermittent wipe cycle of the wiper is set in accordance with the resistance value of the variable resistor, the method comprising:
storing a maximum resistance value of the variable resistor;
detecting the resistance value of the variable resistor;
renewing the maximum resistance value with a new detected maximum resistance value when a predetermined reference time elapses from when a resistance value that is greater than the maximum resistance value of the variable resistor stored in the step of storing is detected in the step of detecting;
recognizing the intermittent wipe cycle of the wiper from the ratio of the resistance value detected in the step of detecting relative to the maximum resistance value of the variable resistor; and
setting the intermittent wipe cycle recognized in the step of recognizing.

9. The method according to claim 8, wherein if a first resistance value, which is greater than the maximum resistance value of the variable resistor stored in the step of storing, is detected in the step of detecting and then a second resistance value, which is greater than the first resistance value, is detected before the reference time elapses, the step of renewing renews the maximum resistance value, which has been stored in the step of storing, with a new maximum resistance value after the reference time elapses from when the second resistance value is detected.

10. The method according to claim 8, wherein:
the step of renewing refrains from updating the maximum resistance value until the reference time elapses from when a resistance value that is greater than the maximum resistance value of the variable resistor stored in the step of storing is detected in the step of detecting if the resistance value decreases by a predetermined amount or more; and
the step of recognizing recognizes a change in the intermittent wipe cycle of the wiper when the resistance value decreases by the predetermined amount.

* * * * *

UNITED STATES PATENT AND TRADEMARK OFFICE
CERTIFICATE OF CORRECTION

| | | |
|---|---|---|
| PATENT NO. | : 7,622,878 B2 | |
| APPLICATION NO. | : 11/446650 | |
| DATED | : November 24, 2009 | |
| INVENTOR(S) | : Kawada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 835 days.

Signed and Sealed this

Fourteenth Day of December, 2010

David J. Kappos
*Director of the United States Patent and Trademark Office*